March 5, 1957
B. L. BINFORD
2,784,273
FLOAT OPERATED DEVICE
Filed Aug. 30, 1954
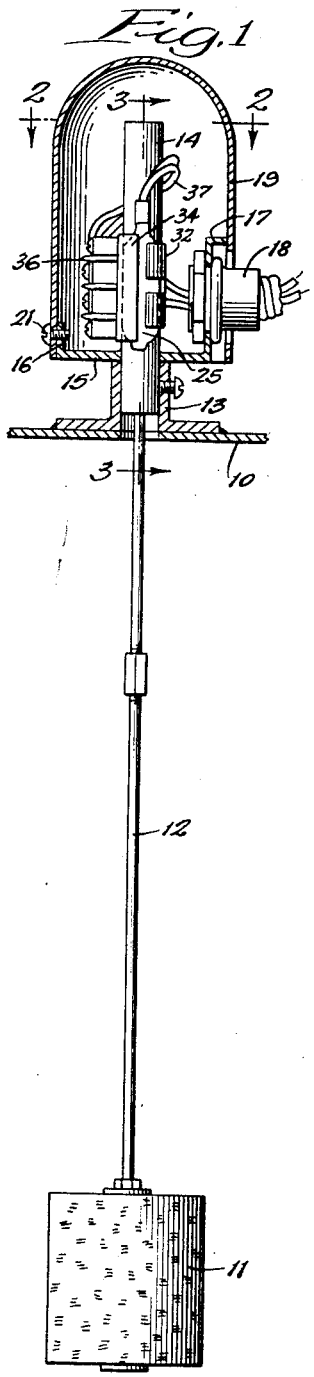
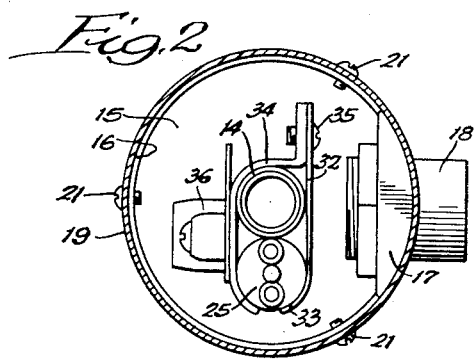
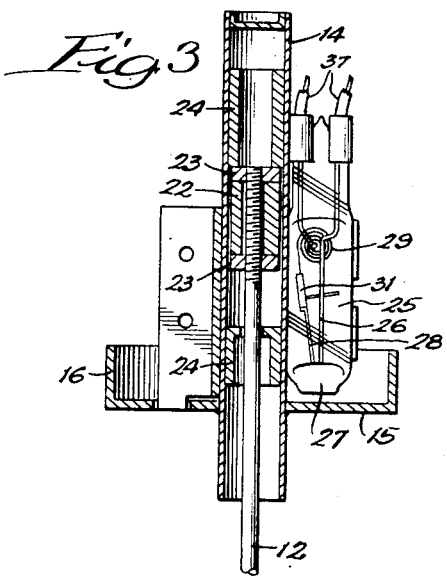
INVENTOR:
Benjamin L. Binford,
BY
Bair Freeman & Molinare
ATTORNEYS.

United States Patent Office 2,784,273
Patented Mar. 5, 1957

2,784,273

FLOAT OPERATED DEVICE

Benjamin L. Binford, Chicago, Ill., assignor to Magnetrol, Inc., Chicago, Ill., a corporation of Illinois Application August 30, 1954, Serial No. 453,040

5 Claims. (Cl. 200—84)

This invention relates to a float operated device and more particularly to a snap acting control device controlled by a liquid level responsive float or displacer.

Magnetically operated control switches operated by movement of a float or displacer have been used very satisfactorily in many industrial applications. There are many such applications where it is desirable to provide a snap action to insure movement of the control device rapidly and positively from one position to another and it is one of the objects of the present invention to provide a float operated device which produces a snap acting control in a simple and inexpensive manner.

Another object is to provide a float operated device in which the same magnetic element which operates the control device also effects the snap action.

Still another object is to provide a float operated device in which the operating magnet cooperates with fixed magnetic elements to provide the snap acting movement of the float.

A further object is to provide a float operated device in which the control is a mercury switch having a magnetic contact moved by magnetic attraction of the control magnet.

A still further object is to provide a float operated device in which the control switch is simply and adjustably mounted by a non-magnetic clamp gripping both the switch and a non-magnetic tube in which the control magnet moves.

The above and other objects and features of the invention will be more readily apparent from the following description when read in connection with the accompanying drawing in which:

Figure 1 is a vertical elevational view with parts in section of a float operated device embodying the invention;

Figure 2 is a transverse section on the line 2—2 of Figure 1; and

Figure 3 is an enlarged vertical section on the line 3—3 of Figure 1.

The device as shown is adapted to effect an indicating or control operation in response to changes of level in a tank or container a portion of whose top is shown at 10.

The level of liquid in the tank or container is sensed by a float 11 secured to a float rod 12 and positioned at approximately the desired liquid level in the tank. Upward and downward movement of the float in the tank will cause corresponding upward and downward movement of the float rod and will be sensed by a control device to effect an indicating or controlling operation.

The complete control unit comprises a base 13 secured to the top of the tank in registry with an opening therein. The base carries a non-magnetic tube 14 which may be formed of brass or other non-ferrous material and which projects vertically from the base. The tube may carry above the base 13 a bottom closure 15 for a housing to enclose the control mechanism. As shown the bottom closure 15 has an upwardly extending edge flange 16 and an upwardly projecting lug 17 to support a wiring conduit connector 18. A cup-shaped housing 19 seats over the bottom closure and may be secured thereto by spaced screws 21.

The tube 14 is adapted to slidably support a magnet 22 for movement with the float rod. As shown the magnet 22 is tubular and the float rod is threaded at its end to extend through the magnet. To secure the magnet to the float rod, nuts or discs 23 of non-magnetic material such as brass are threaded onto the float rod and engage the opposite ends of the tubular magnet 22. The nuts or discs 23 also serve as non-magnetic spacers as explained more fully hereinafter.

To provide a snap acting movement of the magnet and the float mechanism the tube 14 carries a pair of spaced magnetic elements which as shown comprise tubular iron pieces 24 press-fitted or otherwise fixed in the tube 14 on opposite sides of the magnet 22. The elements 24 are spaced further apart than the length of the magnet 22 so that it may have a limited degree of movement between the elements 24. When the magnet is adjacent to either of the elements 24 it tends to remain in that position due to magnetic attraction but will be moved by the float whose weight and displacement are greater than the magnetic attraction between the magnetic elements.

Movement of the magnet is adapted to operate a control device shown as a mercury switch having a sealed glass casing 25 with a fixed contact 26 therein engaging a pool of mercury 27 at the bottom of the tube. A movable contact 28 is supported by a spring 29 and is normally biased to a position in which it also engages the pool of mercury to complete a circuit between the contacts. The contact 28 may be formed of a magnetic material or may carry an enlarged magnetic armature 31. The switch is so positioned that the spring 29 normally biases the magnetic armature 31 away from the tube 14 and so that the armature will be attracted by the magnet 22 when it registers with the armature to pull the contact 28 toward the tube and out of the pool of mercury. When the magnet 22 is in its uppermost position as shown it is out of registry with the armature 31 and when it is moved to its lowermost position in engagement with the lower magnetic elements 24 it will register with the armature 31 and interrupt the switch circuit.

In operation, when the liquid level is high it will elevate the magnet 22 to the position shown in Figure 3 and the switch circuit will be closed. As the level drops the float tends to fall with the level but will be held in its upper position by magnetic attraction between the upper element 24 and the magnet 22 until the float is substantially completely out of the liquid. At this time the weight of the float will be sufficient to break the magnetic attraction so that the float will drop to its lowermost limit in which the lower spacer 23 rests on the lower magnetic element 24. At this time the upper end of the magnet 22 will register with the armature 31 to attract it and interrupt the circuit.

On an increase in level magnetic attraction between the magnet 22 and the lower element 24 will hold the float down until it is almost completely submerged at which time its buoyancy will be sufficient to break the magnetic attraction. The float will therefore rise rapidly to its maximum upper limit in which the upper spacer 23 engages the upper element 24 and the magnet is moved away from the armature 31. Thus with the present construction the float moves with a snap action due solely to the magnetic attraction between the operating magnet 22 and the spaced magnetic elements 24.

To mount the mercury switch a very simple non-magnetic mounting bracket as best shown in Figures 2 and 3 is provided. This bracket comprises an elongated piece 32 of brass or the like turned over at one end as shown at 33. A second piece of similar non-magnetic material 34 is connected to the piece 32 by screws 35 and is offset to open and engage the tube 14. The ends of the pieces 32 and 34 project beyond the tube to engage and grip the switch 25 between them. Thus with this very simple bracket the switch can be securely mounted on the tube and can easily be adjusted to a desired vertical height therealong.

Preferably the piece 34 carries a terminal strip 36 to which wiring connections 37 from the mercury switch can be connected and to which external leads brought into the housing through the terminal 18 can also be connected. With this very simple construction the switch can easily be assembled to perform a desired indicating or control operation.

While one embodiment of the invention has been shown and described in detail it will be understood that this is illustrative only and is not to be taken as a definition of the scope of the invention, reference being had for this purpose to the appended claims.

What is claimed is:

1. A float operated device comprising a vertical tube of non-magnetic material, a pair of magnetic elements mounted in the tube at spaced points, a complementary magnetic element movably mounted in the tube and shorter vertically than the space between the first named elements, a float connected to the last named element to move it vertically in response to changes in the level of a body of liquid, the float having greater weight and greater lift than the magnetic attraction between the magnetic elements whereby it will exert sufficient force in either an upward or downward direction to move the last named magnetic element, and a control device mounted outside of the tube including a magnetic part movable in response to the effect of the last named magnetic element as it moves up and down in the tube.

2. A float operated device comprising a vertical tube of non-magnetic material, a pair of magnetic elements mounted in the tube at spaced points, a complementary magnetic element movably mounted in the tube and shorter vertically than the space between the first named elements, a float connected to the last named element to move it vertically in response to changes in the level of a body of liquid, the float having greater weight and greater lift than the magnetic attraction between the magnetic elements whereby it will exert sufficient force in either an upward or downward direction to move the last named magnetic element, a non-magnetic clamp gripping the tube, a terminal block on the clamp, and a mercury switch gripped by the clamp and held thereby against the tube, the switch including a movable magnetic contact biased away from the tube and attracted toward the tube by the last named magnetic element when it is in registry with said contact.

3. A float operated device comprising a vertical tube of non-magnetic material, a pair of magnetic elements mounted in the tube at spaced points, a complementary magnetic element movably mounted in the tube and shorter vertically than the space between the first named elements, a float connected to the last named element to move it vertically in response to changes in the level of a body of liquid, the float having greater weight and greater lift than the magnetic attraction between the magnetic elements whereby it will exert sufficient force in either an upward or downward direction to move the last named magnetic element, non-magnetic spacers between the last named magnetic element and the first named magnetic elements to provide a non-magnetic gap between the elements whereby they can separate easily in response to the float, and a magnetically operated control device mounted outside of the tube to be operated by movement of the last named magnetic element in the tube.

4. A float operated device comprising a vertical tube of non-magnetic material, a pair of magnetic elements mounted in the tube at spaced points, a tubular magnetic element movably mounted in the tube and shorter vertically than the space between said pair of elements, a float adapted to be displaced vertically by changes in the level of a body of liquid, a rod on the float extending slidably through the lower of said pair of elements and through the tubular element, a pair of non-magnetic discs secured to the float rod on opposite ends of the tubular element to connect it to the float rod and to provide a non-magnetic gap between the elements whereby they can separate easily in response to force exerted by the float, and a control device mounted outside of the tube including a magntic part movable in response to the effect of the tubular magnetic element as it moves up and down in the tube.

5. A float operated device comprising a vertical tube of non-magnetic material, a pair of magnetic elements mounted in the tube at spaced points, a tubular magnetic element movably mounted in the tube and shorter vertically than the space between said pair of elements, a float adapted to be displaced vertically by changes in the level of a body of liquid, a rod on the float extending slidably through the lower of said pair of elements and through the tubular element, a pair of non-magnetic discs secured to the float rod on opposite ends of the tubular element to connect it to the float rod and to provide a non-magnetic gap between the elements whereby they can separate easily in response to force exerted by the float, a non-magnetic clamp spanning and gripping the tube, a mercury switch gripped by the clamp and held thereby against the tube, and a movable magnetic contact in the switch biased away from the tube and moved toward the tube by the tubular magnetic element when it is in registry with said part.

References Cited in the file of this patent

UNITED STATES PATENTS

| | | |
|---|---|---|
| 2,518,480 | Lilja | Aug. 15, 1950 |
| 2,524,261 | Kaminky | Oct. 3, 1950 |
| 2,665,344 | Zozulin et al. | Jan. 5, 1954 |